July 8, 1952  K. CONNING  2,602,488
ARMREST ATTACHMENT FOR MOTOR VEHICLES
Filed Sept. 3, 1949
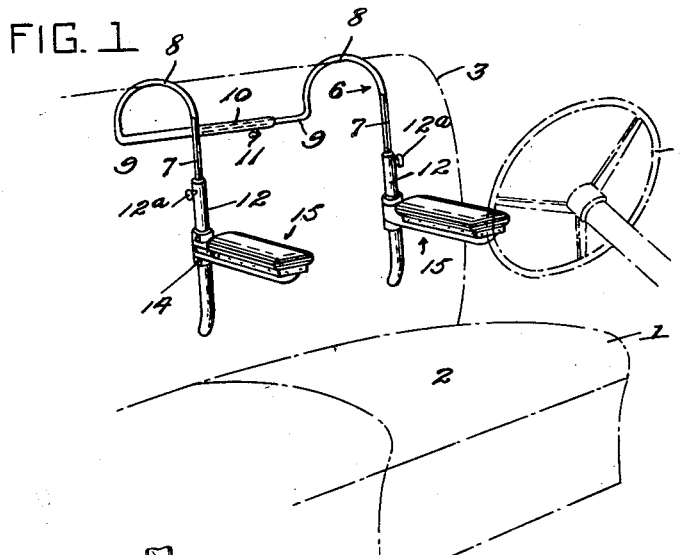
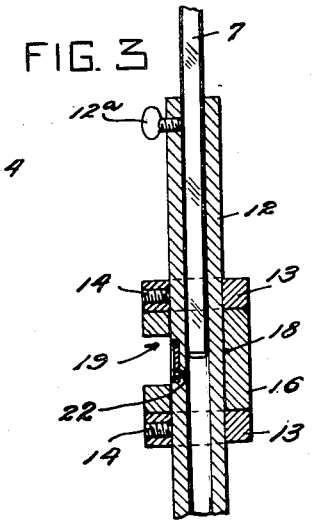
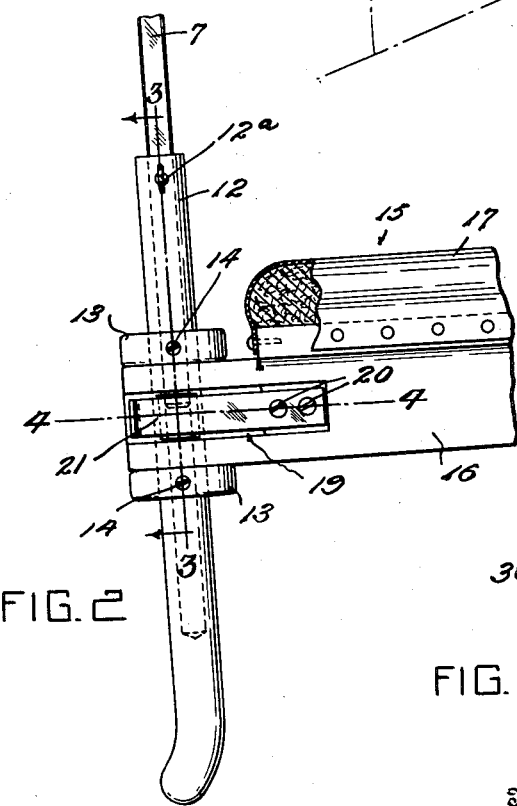
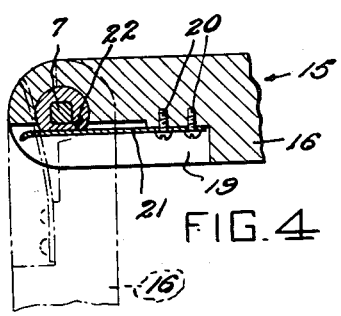
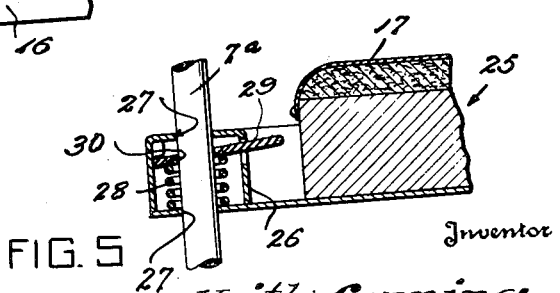
Inventor
Keith Conning
By M. S. McDowell
Attorney Patented July 8, 1952

2,602,488

UNITED STATES PATENT OFFICE 2,602,488

ARMREST ATTACHMENT FOR MOTOR VEHICLES

Keith Conning, Columbus, Ohio

Application September 3, 1949, Serial No. 113,934

3 Claims. (Cl. 155—112)

This invention relates to an improved arm rest accessory for application to motor vehicle body seats.

In the operation of motor vehicles, comfortable seating facilities are provided usually by the manufacturers. However, the conventional vehicle body fails to provide the adequate support for the arms of its occupants. In some cases, stationary arm rests are provided on the doors of such vehicles, and in others the rear seats are formed with swinging divider members constituting arm rests. It has been observed in the driving of automobiles for protracted periods of time that the drivers particularly of such vehicles suffer from fatigue and physical strain. A large part of this fatigue or strain can be relieved if the driver's forearms are supported in a comfortable and relaxed manner.

The ordinary fixed arm rest on the door at the side of the vehicle operator does not offer such comfort. Such an arm rest will support the left arm only of the driver if the arm rest happens to be in a position of conformity with the stature or physical dimensions of the driver. However, such a fixed support at one side of the driver does not extend to the other side. Likewise, a folding divider rest of the type set forth does not offer adequate support for the arms of the vehicle occupants.

The present invention, therefore, has for one of its objects to provide a simple and convenient accessory which may be applied quickly to the standard passenger seats of a motor vehicle body in a secure but detachable manner and which will offer comfortable and strain-relieving support for the arms of the vehicle occupants.

Another object is to provide an auxiliary arm-resting device for motor vehicles in which a pair of parallel arm supports is provided adapted to be arranged at both sides of a seated vehicle occupant, enabling the arms of the occupant to be supported in a fatigue and strain-relieving manner on the supports without interfering with the normal use of the operator's arms in effecting vehicle operations.

Another object of the invention is to provide an arm-supporting attachment for motor vehicles in which arm supports are mounted for vertical adjustment on frame members carrying the same, whereby to adapt the supports to the physical conformations of various vehicle occupants.

A further object of the invention is to form the arm supports so that the same swing freely in horizontal planes on their supporting elements provided by associated attaching frames, so that the arm supports will not interfere with necessary movements of vehicle occupants in assuming seated positions or when leaving such seated positions, the arm supports assuming automatically parallel positions when released.

Still another object of the invention is to provide an attachment of this character which is of simple construction, inexpensive to produce and reliable and efficient in operation.

For a further understanding of the invention, reference is to be had to the following description and the accompanying drawing, wherein:

Fig. 1 is a perspective view disclosing the interior of a motor vehicle and illustrating the driver's position with the arm-supporting device forming the present invention;

Fig. 2 is a side elevational view, partly in section, of the arm-supporting device of the present invention;

Fig. 3 is a detail vertical sectional view on the line 3—3 of Fig. 2;

Fig. 4 is a detail horizontal sectional view taken on the line 4—4 of Fig. 2; and Fig. 5 is a detail sectional view showing a modified holding means for retaining the arm rest in adjusted positions.

Referring to the drawings, the numeral 1 designates the conventional driver's seat of a motor vehicle, the same embodying the usual cushioned base 2 and a back 3, all of standard construction, the seat being arranged to the rear of a steering wheel 4. The present invention provides an auxiliary arm-resting device for use on such a vehicle seat.

In a preferred adaptation, the device comprises a bent wire frame 6, having parallel vertically extending leg members 7 which at their upper ends are each bent to provide loops 8, the latter being shaped to receive the upper part of the seat back 3, the loops terminating rearwardly in laterally directed horizontally disposed extensions 9. In this instance, one of the extensions has formed therewith a sleeve 10 in which the other of said extensions is telescopingly received. A set screw 11 may be carried by the sleeve 10 to hold the telescoped extension against movement, whereby to cause the spacing of the leg members 7 to conform with the back measurements of a particular occupant.

The leg members 7 throughout the greater part of their lengths are substantially square in transverse cross section. The squared portions of these leg members are received in a telescoping manner in vertically adjustable rest-carrying tubular members 12 which constitute extensions, as it were, of the leg members 7. Set screws 12a may be used to maintain definite positions of relative adjustment between the tubular members 12 and the leg members 7.

In this instance, each of the tubular members 12 is provided with a pair of vertically spaced collars 13 which may be maintained in their spaced positions of relative adjustment through the agency of set screws 14 or their equivalents. Confined between the collars 13 for swinging movement about the vertical axes of the tubular members 12 are the inner ends of a pair of arm rests of the type indicated at 15.

Advantageously, each of these arm rests may be formed to embody a supporting bar 16 having a cushion or pad 17 suitably mounted coextensively on the upper surface of each bar 16. At its rear end, each of said bars is formed with a vertical opening 18 for the reception of an associated tubular member 12, in order that the arm rest may swing bodily about the vertical axis of the associated tubular member. This feature is of importance in enabling a vehicle occupant to readily assume or leave a seated position in a vehicle body, since the arm rests turn readily about the tubular members and thus will not interfere with the movements of the vehicle occupant or occupants.

However, to retain the arm rests normally in substantially parallel relationship in the manner in which they are viewed in Fig. 1 of the drawings, each of the bars is mortised, as at 19, at the rear end thereof, with the mortise intersecting in part the opening or bore 18. In this instance there is attached, as at 20, to the vertical wall of each mortise, one end of a leaf spring 21, the outer free end of said leaf spring having resilient engagement with a flattened surface 22 provided upon each of the tubular members 12. Each flattened surface is so arranged that it maintains, through cooperation with its associated leaf spring 21, the arm rests in their operative or active positions in which said rests project forwardly and perpendicularly in parallel relationship from the seat back 3. Through this construction, the arm rests are positively maintained in such active positions by the leaf springs 21 and similarly in their inactive positions in which the arm rests extend parallel with the seat back 3.

While the construction described is simple and advantageous in attaining the ends of the present invention, nevertheless, it will be understood that variations or modifications may be provided within the scope of the invention. For example, in Fig. 5, an arm rest has been indicated by the numeral 25. The rear of the arm rest is formed with a casing 26 having openings 27 therein for the reception of leg members 7a. Within each of the casings 26 is a coil spring 28 which engages with a pivotally movable locking plate 29. Normally this plate is positioned so that the walls of an opening 30 therein will grip the leg member 7a to retain the arm rest 25 in its various positions of vertical adjustment on the leg member or members 7a, and at the same time will permit said arm rest or rests to be turned in horizontal planes against certain frictional resistance set up between the relatively movable parts of the arm rest and the leg member. When it is desired to raise or lower the arm rest, the plate 29 is depressed against the action of the spring 28, thus bringing the opening in the locking plate into more positive registration with the leg member 7a, enabling the arm rest to be moved freely.

In view of the foregoing, it will be appreciated that the present invention provides a simple attachment or accessory for motor vehicle bodies which will provide an automobile seat with a means for effecting a more convenient support for the arms of the vehicle occupants. The accessory is particularly useful by the drivers of motor vehicles in that it provides means for relieving a driver of the strain set up by maintaining the arms in fixed positions for protracted periods of time. The accessory may be easily attached to or removed from the seat structure of an automobile body, and through the features set forth may be adjusted to meet the physical requirements of various individuals.

I claim:

1. In an arm-supporting accessory for automobile seats, a frame formed to be hooked over the upper edge of the back of an associated automobile seat and presenting forwardly disposed parallel vertically extending leg members at the front of the seat and rearwardly disposed connecting means to the rear of the seat, tubular extensions slidably positioned on said leg members, means for maintaining said extensions in various positions of adjustment with respect to said leg members, a plurality of arm rests, means for uniting the inner end of each of said arm rests with one of said tubular extensions for turning movement in a substantially horizontal plane, and resilient means cooperative with said arm rests for resisting turning movement thereof in a horizontal direction.

2. In a detachable arm-supporting accessory for automobile seats, a leg member, a tubular extension slidably mounted on said leg member, means for maintaining the tubular extension in various positions of adjustment on said leg member, an arm rest embodying a padded bar, said bar at one end thereof being formed with an opening through which said tubular extension passes whereby to provide for turning movement of said arm rest about the major axis of said extension, and a leaf spring carried by said bar and cooperative with a flattened surface provided on said extension for resisting turning movement of the arm rest relative to said extension.

3. In an arm rest for automobile seats, a frame including a pair of leg members arranged in parallel order at the front of the back member of an automobile seat, said leg members throughout a major portion of their length being substantially square in transverse cross section, tubular extensions having square bores for the slidable reception of said leg members, means for maintaining said tubular extensions and said leg members in various positions of relative adjustment, an arm rest projecting from each of said tubular extensions, each of said arm rests having the rear end thereof formed with an opening through which one of said tubular extensions passes, spaced collars positioned on each of said extensions and between which the inner end of an arm rest is positioned for turning movement, and spring means carried by each of said arm rests and cooperative with a flattened surface formed on each of said extensions for resisting movement of said arm rests horizontally from predetermined positions of operation.

KEITH CONNING.

REFERENCES CITED

The following references are of record in the file of this patent:

UNITED STATES PATENTS

| Number | Name | Date |
|---|---|---|
| 319,105 | McClure | June 2, 1885 |
| 414,392 | Findley | Nov. 15, 1889 |
| 585,913 | Haynes | June 6, 1897 |
| 766,484 | Armstrong | Aug. 2, 1904 |
| 1,378,704 | McParland | May 17, 1921 |
| 1,579,585 | Weider | Apr. 6, 1926 |
| 1,731,709 | Cropsey | Oct. 15, 1929 |
| 2,481,382 | Bennett | Sept. 6, 1949 |